United States Patent [19]

Gerber

[11] Patent Number: 4,477,744
[45] Date of Patent: Oct. 16, 1984

[54] PERMANENT MAGNET ROTOR WITH GAPS BETWEEN THE MAGNET AND THE HUB

[75] Inventor: Hermann Gerber, Münchenwiler, Switzerland

[73] Assignee: Sodeco-Saia, A.G., Multen, Switzerland

[21] Appl. No.: 527,300

[22] Filed: Aug. 29, 1983

[30] Foreign Application Priority Data

Sep. 15, 1982 [CH] Switzerland ............... 5461/82

[51] Int. Cl.³ .................................. H02K 21/12
[52] U.S. Cl. .................................. 310/156; 310/42
[58] Field of Search .................. 310/154, 156, 42

[56] References Cited

U.S. PATENT DOCUMENTS 2,060,260 11/1936 Spengler ............................ 310/156
2,637,825 5/1953 Moore ............................... 310/156
3,482,156 12/1969 Porath ........................... 310/156 X
4,025,810 5/1977 Field ............................. 310/156 X

FOREIGN PATENT DOCUMENTS 524913 7/1972 Switzerland .
1353082 5/1974 United Kingdom .

*Primary Examiner*—Mark O. Budd
*Attorney, Agent, or Firm*—Ernexst F. Marmorek

[57] ABSTRACT

A rotor for a synchronous motor includes a permanent ring magnet which has an inner surface, and a hub which has an outer surface. The hub is provided with a rotor shaft. Each surface is formed with a plurality of teeth. The teeth formed on one surface are shaped so as to be able to engage the teeth formed on the other surface. The engaged teeth form a force-locking connection between the ring magnet and the hub, when the hub is pressed into the ring magnet.

11 Claims, 1 Drawing Figure

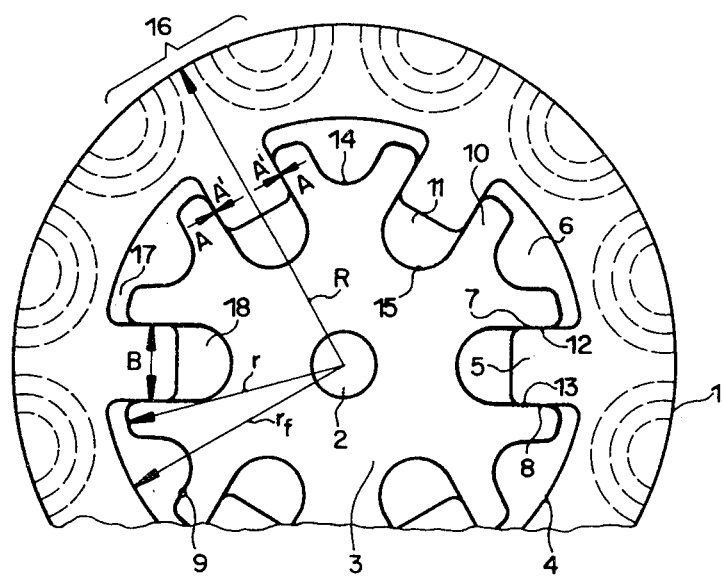

PERMANENT MAGNET ROTOR WITH GAPS BETWEEN THE MAGNET AND THE HUB

BACKGROUND OF THE INVENTION

The present invention relates to a rotor for synchronous motors, which includes a permanent ring magnet, and a hub provided with a rotor shaft, which is connected to the ring magnet.

It has been known to use rotors of this type in synchronous motors. Connection of the rotor hub with the ring magnet is generally accomplished by pressing the hub into the ring magnet, as a result of which pressures in the ring magnet acting in a radial direction give rise to tensile stresses therein, which, in turn, frequently result in tears.

From Swiss Pat. No. 524,912, as well as from British Patent 1,353,082 rotors are known, whose magnet carriers or hubs include holding portions, which are in form-locking or force-locking connection with the front sides of the permanent ring magnets. Due to different respective coefficients of expansion of the magnet material and of the carrier material, tensile stresses in the ring magnet, and tears resulting therefrom can still not be avoided in the aforesaid constructions.

SUMMARY OF THE INVENTION

It is therefore an object of the present invention to devise a rotor in which any damage-producing tensile stresses are largely avoided in a ring magnet.

This object is attained in a rotor for a synchronous motor of the aforedescribed kind, in which the inner surface of the permanent ring magnet and the outer surface of the hub are each provided with a plurality of teeth, and wherein the teeth of one surface are shapd to engage the teeth of the other surface, a feature not found in the prior art cited. The engaged teeth form a force-locking connection between the ring magnet and the hub when the hub is pressed into the ring magnet so as to be connected thereto.

BRIEF DESCRIPTION OF THE DRAWINGS

For a fuller understanding of the nature and objects of the present invention, reference should be had to the following detailed description, taken in connection with the sole drawing, which is a part-section of the rotor in a plane perpendicular to the rotor shaft.

DESCRIPTION OF THE PREFERRED EMBODIMENTS

Referring now to the drawing, the rotor consists of a ring-shaped permanent magnet, hereinafter referred to as ring magnet 1, and a hub 3 rigidly connected to a rotor shaft 2, which serves as a carrier of the ring magnet 1. The ring magnet 1 is formed on an inner surface thereof with a toothing 4, including a plurality of teeth 5, and has gaps 6 formed between respective teeth 5. Flanks 7 and 8 of each tooth 5 extend substantially parallel with a plane passing through a center axis of the rotor shaft 2. The edges of the teeth 5, and the contours of the gap 6 are rounded. The hub 3 is made of synthetic material, preferably of synthetic material (GV) reinforced with glass fibers. The outer radius r of the hub 3 is smaller by about 0.5 mm than the the radius $r_f$ of a foot circle of the ring magnet 1. The hub 3 is formed with an outer toothing 9 provided with the same plurality of teeth as the ring magnet 1. The outer toothing 9 includes teeth 10 formed with gaps 11 between respective teeth. The flanks 12 and 13 of a respective pair of teeth 10 bordering each gap 11 extend substantially parallel with a plane passing in radial symmetry through the gap 11. Each tooth 10 is formed with a slot 14, and each gap 11 communicates with a semicircular recess 15. The edges of the teeth 10 are also rounded. The width B of each tooth 5 of the ring magnet 1 corresponds to the width of each gap 11 formed in the hub 3. The magnetizing lines of force of the ring magnet 1, which has a plurality of poles equal to the plurality of its teeth, are generally denoted by the reference numeral 16, and the magnetic anisotropy of the ring magnet 1 extends radially.

The hub 3 is pressed into the ring magnet 1 so that the teeth 5 of the ring magnet 1 fill respective gaps 11 of the hub 3. This results in a force-locked connection of the two rotor parts 1 and 3 formed by a press fit or frictional fit of the respective tooth contact surfaces or flanks 7 and 8 of a tooth 5, with the corresponding flanks or tooth contact surfaces 12 and 13 of a tooth 10. Due to the different respective diameters r of the hub 3, on one hand, and of the radius of the footcircle $r_f$, on the other hand, as well as due to the formation of the semi-circular recess 15 in each gap 11 of the hub 3, there remain slots 17 and 18 between the pressed-in hub 3 and the ring magnet 1 extending generally in a radial direction. The existence of the slots 17 and 18 prevents contact of either the outwardly facing portions of a tooth 10 with an inwardly facing portion of a corresponding surface of the ring magnet 1, or of the inwardly facing portion of a tooth 5 with the innermost surface of the hub 3, defined by a portion of the semi-circular recess 15 of each gap 11. Thus contact of the aforenamed facing portions, due to thermally caused expansions or contractions in a radial direction, is avoided. Thus sufficient play is provided to the hub 3 in a radial direction to avoid any stresses under all circumstances due to any radially exerted pressure. The elasticity of the teeth 10 of the hub 3 may be varied by the shape and size of the slots 14 formed in the heads of the teeth 10.

Instead of providing a press-fit connection between the hub 3 and the ring magnet 1, such a connection may be established by glueing, ultrasonic welding, or laser welding at the same location.

During pressing of the hub 3 into the ring magnet 1, pressures are exerted by the teeth 10 of the hub 3 onto the teeth 5 of the ring magnet 1 in a tangential direction as denoted by the arrows A, which are balanced by counterforces A' exerted by the teeth 5 of the ring magnet 1 onto the teeth 10. Otherwise no pressures arise acting in a radial direction, which might lead to tensile stresses in the ring magnet 1, and might cause any tears therein.

The choice of the GV synthetic material for the hub 3 has the advantage that, on one hand, a sufficiently tight fit of the hub 3 on the rotor shaft 2 can be attained, and that, on the other hand, approximately equal expansion coefficients of the two rotor parts 1 and 3 are attained, so that no frictional forces develop due to any thermal influence. Otherwise the hub 3 may be made of any other suitable synthetic material, or of an extruded or sintered work material, or of a magnetically conducting material, for example of sintering iron. It is important that the material of the hub 3 and that of the ring magnet 1 have similar expansion coefficients, in order to avoid any pressure stresses in the ring magnet 1 due to friction between the contact surfaces of corresponding parts.

It is also advantageous if the hub 3 and the ring magnet 1 are constructed so that they can be manufactured by injection techniques, continuous casting techniques, extrusion techniques, or sintering techniques.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A rotor for a synchronous motor, comprising in combination
   a permanent ring magnet having an inner surface,
   a hub including a rotor shaft and having an outer surface, each surface being formed with a plurality of teeth, the teeth of one surface being engageable with the teeth of the other surface, said hub being pressable into said permanent ring magnet, said teeth being shaped so that the engaged teeth form a force-locking connection between said ring magnet when said hub is pressed into said ring magnet, but gaps remain between said hub and said ring magnet which extend along a substantially radial direction, whereby a connection between said hub and said ring magnet is established, while said hub and said ring magnet remain free of being subjected to any tensile stresses along said substantially radial direction.

2. The rotor as claimed in claim 1, wherein the plurality of teeth of one surface equal the plurality of the teeth of the other surface, each tooth being formed with a flank extending substantially parallel with a plane passing through a center axis of said rotor.

3. The rotor as claimed in claim 2, wherein said force locking connection is a frictional connection formed between said flanks.

4. The rotor as claimed in claim 2, wherein said force-locking connection is a glued connection between said flanks.

5. The rotor as claimed in claim 2, wherein said force-locking connection is an ultrasonically welded connection.

6. The rotor as claimed in claim 2, wherein said force-locking connection is a laser-welded connection.

7. The rotor as claimed in claim 1, wherein each tooth of said hub has a recess.

8. The rotor as claimed in claim 7, wherein each tooth of said hub has a flank, said recess extending in a radially inward direction approximately midway between said flanks.

9. The rotor as claimed in claim 1, wherein said hub is made of a first material having a first coefficient of expansion, and said ring magnet is made of a second material having a second coefficient of expansion approximately equal to said first coefficient of expansion.

10. The rotor as claimed in claim 9, wherein said first material is a magnetically conducting material.

11. The rotor as claimed in claim 1, wherein said ring magnet includes a plurality of poles equal to that of the teeth of said ring magnet.

* * * * *